US008873757B2

(12) United States Patent
Escott et al.

(10) Patent No.: US 8,873,757 B2
(45) Date of Patent: Oct. 28, 2014

(54) METHODS AND APPARATUS FOR PROVIDING NETWORK-ASSISTED KEY AGREEMENT FOR D2D COMMUNICATIONS

(71) Applicant: QUALCOMM Incorporated, San Diego, CA (US)

(72) Inventors: Adrian Edward Escott, Reading (GB); Michaela Vanderveen, Tracy, CA (US); Alexander W. Dent, San Diego, CA (US)

(73) Assignee: QUALCOM Incorporated, San Diego, CA (US)

( * ) Notice: Subject to any disclaimer, the term of this patent is extended or adjusted under 35 U.S.C. 154(b) by 105 days.

(21) Appl. No.: 13/655,884

(22) Filed: Oct. 19, 2012

(65) Prior Publication Data
US 2014/0112474 A1    Apr. 24, 2014

(51) Int. Cl.
*H04K 1/00* (2006.01)

(52) U.S. Cl.
USPC ........................................................ 380/270

(58) Field of Classification Search
CPC ..... H04L 9/04; H04L 63/0428; H04W 12/04; H04W 12/06; H04W 12/02
USPC .......................................... 380/270; 370/270
See application file for complete search history.

(56) References Cited

U.S. PATENT DOCUMENTS

| 2008/0235511 | A1  |  9/2008 | O'brien et al. |        |
|--------------|-----|---------|----------------|--------|
| 2010/0142407 | A1* |  6/2010 | Serravalle ..................... | 370/254 |
| 2010/0226314 | A1* |  9/2010 | Xu ................................. | 370/328 |
| 2010/0316223 | A1* | 12/2010 | Blom et al. .................... | 380/278 |
| 2012/0113862 | A1* |  5/2012 | Santhanam et al. .......... | 370/254 |

FOREIGN PATENT DOCUMENTS

| EP | 1921792 A1     |  5/2008 |
|----|----------------|---------|
| WO | 2004098145 A1  | 11/2004 |
| WO | 2007044597     |  4/2007 |
| WO | WO2009018510 A1 |  2/2009 |
| WO | WO2011085810 A1 |  7/2011 |
| WO | WO2011117677 A1 |  9/2011 |
| WO | WO2011152665 A2 | 12/2011 |

OTHER PUBLICATIONS

International Search Report and Written Opinion—PCT/US2013/065728—ISA/EPO—Jan. 3, 2014.

* cited by examiner

*Primary Examiner* — Kambiz Zand
*Assistant Examiner* — Aubrey Wyszynski
(74) *Attorney, Agent, or Firm* — James K. O'Hare

(57) ABSTRACT

A method, an apparatus, and a computer program product for wireless communication are provided in connection with facilitating secure D2D communications in a LTE based WWAN. In one example, a UE is equipped to send a shared key request using a first non-access stratum (NAS) message to a MME, calculate a first UE key based on a MME-first UE key, an uplink count value, and at least a portion of contextual information, receive a second NAS message from the MME, and calculate a final UE key based at least on the first UE key. In another example, a MME is equipped to receive a NAS message such as the message send by the first UE, calculate a first UE key, receive a message at least indicating successful contact with the second UE, and send a second NAS message to the first UE indicating the successful contact.

88 Claims, 16 Drawing Sheets

METHODS AND APPARATUS FOR PROVIDING NETWORK-ASSISTED KEY AGREEMENT FOR D2D COMMUNICATIONS

BACKGROUND

1. Field

The present disclosure relates generally to communication systems, and more particularly, to facilitate secure device to device (D2D) communications in a Long Term Evolution (LTE) based wireless wide area network (WWAN).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. LTE may support direct device-to-device (D2D) (peer-to-peer) communication.

Many devices may be operable in a cellular network. When a first device detects another device, the first device may attempt to communicate directly with the device of interest. Serving mobility management entities (MMEs) may be used to establish a D2D communication link between the devices. No functionality exists within the WWAN that allows the two devices that are attached to an LTE network to perform secure D2D communications where there is no key in common As the demand for D2D communication increases, there exists a need for methods/apparatuses for supporting secure D2D communications within LTE while minimizing use of WWAN resources.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating secure D2D communications in a LTE based WWAN. In one example, a UE is equipped to send a shared key request using a first non-access stratum (NAS) message to a MME, that indicates an uplink count value and includes at least a portion of contextual information associated with communication with a second UE, calculate a first UE key based on a MME-first UE key, the uplink count value, and the at least a portion of the contextual information, receive a second NAS message from the MME at least indicating successful contact with the second UE, and calculate a final UE key based at least on the first UE key. In another example, a MME is equipped to receive a NAS message such as the message send by the first UE, calculate a first UE key based on a MME-first UE key, the uplink count value, and the at least a portion of the contextual information, receive a message at least indicating successful contact with the second UE, and send a second NAS message to the first UE at least indicating the successful contact with the second UE.

According to related aspects, a method for facilitating secure D2D communications in a LTE based WWAN is provided. The method can include sending, by a first UE, a shared key request using a first NAS message to a MME. In an aspect, the first NAS message may indicate an uplink count value and may include at least a portion of contextual information associated with communication with a second UE. Further, the method can include calculating a first UE key based on a MME-first UE key that is shared between the MME and the first UE, the uplink count value, and the at least a portion of the contextual information. Further, the method can include receiving a second NAS message from the MME at least indicating successful contact with the second UE. Moreover, the method may include calculating a final UE key in response to receiving the second NAS message based at least on the first UE key.

Another aspect relates to a communications apparatus configured to facilitate secure D2D communications in a LTE based WWAN. The communications apparatus can include means for sending, by a first UE, a shared key request using a first NAS message to a MME. In an aspect, the first NAS message may indicate an uplink count value and may include at least a portion of contextual information associated with communication with a second UE. Further, the communications apparatus can include means for calculating a first UE key based on a MME-first UE key that is shared between the MME and the first UE, the uplink count value, and the at least a portion of the contextual information. Further, the communications apparatus can include means for receiving a second NAS message from the MME at least indicating successful contact with the second UE. Moreover, the communications apparatus can include means for calculating a final UE key in response to receiving the second NAS message based at least on the first UE key.

Another aspect relates to a communications apparatus. The apparatus can include a processing system configured to send, by a first UE, a shared key request using a first NAS message to a MME. In an aspect, the first NAS message may indicate an uplink count value and may include at least a portion of contextual information associated with communication with a second UE. Further, the processing system may be configured to calculate a first UE key based on a MME-first UE key that is shared between the MME and the first UE, the uplink count value, and the at least a portion of the contextual information. Further, the processing system may be configured to receive a second NAS message from the MME at least indicating successful contact with the second UE. Moreover, the processing system may further be configured to calculate a final UE key in response to receiving the second NAS message based at least on the first UE key.

Still another aspect relates to a computer program product, which can have a computer-readable medium including code for sending, by a first UE, a shared key request using a first NAS message to a MME. In an aspect, the first NAS message may indicate an uplink count value and may include at least a portion of contextual information associated with communication with a second UE. Further, the computer-readable medium can include code for calculating a first UE key based on a MME-first UE key that is shared between the MME and the first UE, the uplink count value, and the at least a portion of the contextual information. Further, the computer-readable medium can include code for receiving a second NAS message from the MME at least indicating successful contact with the second UE. Moreover, the computer-readable medium can include code for calculating a final UE key in response to receiving the second NAS message based at least on the first UE key.

According to related aspects, a method for facilitating secure D2D communications in a LTE based WWAN is provided. The method can include receiving a first NAS message, by a second UE, which indicates a downlink count value and includes at least a portion of contextual information associated with communication with a first UE. Further, the method can include sending a second NAS message. Further, the method can include calculating a second UE key based on a MME-second UE key that is shared between the MME and the second UE, at least one of an uplink count value associated with the second NAS message or the downlink count value, and the at least a portion of the contextual information. Moreover, the method may include calculating a final UE key based at least on the second UE key.

Another aspect relates to a communications apparatus configured to facilitate secure D2D communications in a LTE based WWAN. The communications apparatus can include means for receiving a first NAS message, by a second UE, which indicates a downlink count value and includes at least a portion of contextual information associated with communication with a first UE. Further, the communications apparatus can include means for sending a second NAS message. Further, the communications apparatus can include means for calculating a second UE key based on a MME-second UE key that is shared between the MME and the second UE, at least one of an uplink count value associated with the second NAS message or the downlink count value, and the at least a portion of the contextual information. Moreover, the communications apparatus can include means for calculating a final UE key based at least on the second UE key.

Another aspect relates to a communications apparatus. The apparatus can include a processing system configured to receive a first NAS message, by a second UE, which indicates a downlink count value and includes at least a portion of contextual information associated with communication with a first UE. Further, the processing system may be configured to send a second NAS message. Further, the processing system may be configured to calculate a second UE key based on a MME-second UE key that is shared between the MME and the second UE, at least one of an uplink count value associated with the second NAS message or the downlink count value, and the at least a portion of the contextual information. Moreover, the processing system may further be configured to calculate a final UE key based at least on the second UE key.

Still another aspect relates to a computer program product, which can have a computer-readable medium including code for receiving a first NAS message, by a second UE, which indicates a downlink count value and includes at least a portion of contextual information associated with communication with a first UE. Further, the computer-readable medium can include code for sending a second NAS message. Further, the computer-readable medium can include code for calculating a second UE key based on a MME-second UE key that is shared between the MME and the second UE, at least one of an uplink count value associated with the second NAS message or the downlink count value, and the at least a portion of the contextual information. Moreover, the computer-readable medium can include code for calculating a final UE key based at least on the second UE key.

According to related aspects, a method for facilitating secure D2D communications in a LTE based WWAN is provided. The method can include receiving, by a MME, a shared key request using a first NAS message. In an aspect, the first NAS message may indicate an uplink count value and may include at least a portion of contextual information associated with communication with a second UE. Further, the method can include calculating a first UE key based on a MME-first UE key that is shared between the MME and a first UE, the uplink count value, and the at least a portion of the contextual information. Further, the method can include receiving a message at least indicating successful contact with the second UE. Moreover, the method may include sending a second NAS message to the first UE at least indicating the successful contact with the second UE.

Another aspect relates to a communications apparatus configured to facilitate secure D2D communications in a LTE based WWAN. The communications apparatus can include means for receiving, by a MME, a shared key request using a first NAS message. In an aspect, the first NAS message may indicate an uplink count value and may include at least a portion of contextual information associated with communication with a second UE. Further, the communications apparatus can include means for calculating a first UE key based on a MME-first UE key that is shared between the MME and a first UE, the uplink count value, and the at least a portion of the contextual information. Further, the communications apparatus can include means for receiving a message at least indicating successful contact with the second UE. Moreover, the communications apparatus can include means for sending a second NAS message to the first UE at least indicating the successful contact with the second UE.

Another aspect relates to a communications apparatus. The apparatus can include a processing system configured to receive, by a MME, a shared key request using a first NAS message. In an aspect, the first NAS message may indicate an uplink count value and may include at least a portion of contextual information associated with communication with a second UE. Further, the processing system may be configured to calculate a first UE key based on a MME-first UE key that is shared between the MME and a first UE, the uplink count value, and the at least a portion of the contextual information. Further, the processing system may be configured to receive a message at least indicating successful contact with the second UE. Moreover, the processing system may further be configured to send a second NAS message to the first UE at least indicating the successful contact with the second UE.

Still another aspect relates to a computer program product, which can have a computer-readable medium including code for receiving, by a MME, a shared key request using a first NAS message. In an aspect, the first NAS message may indicate an uplink count value and may include at least a portion of contextual information associated with communication with a second UE. Further, the computer-readable medium can include code for calculating a first UE key based on a MME-first UE key that is shared between the MME and a first UE, the uplink count value, and the at least a portion of the contextual information. Further, the computer-readable medium can include code for receiving a message at least indicating successful contact with the second UE. Moreover, the computer-readable medium can include code for sending a second NAS message to the first UE at least indicating the successful contact with the second UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
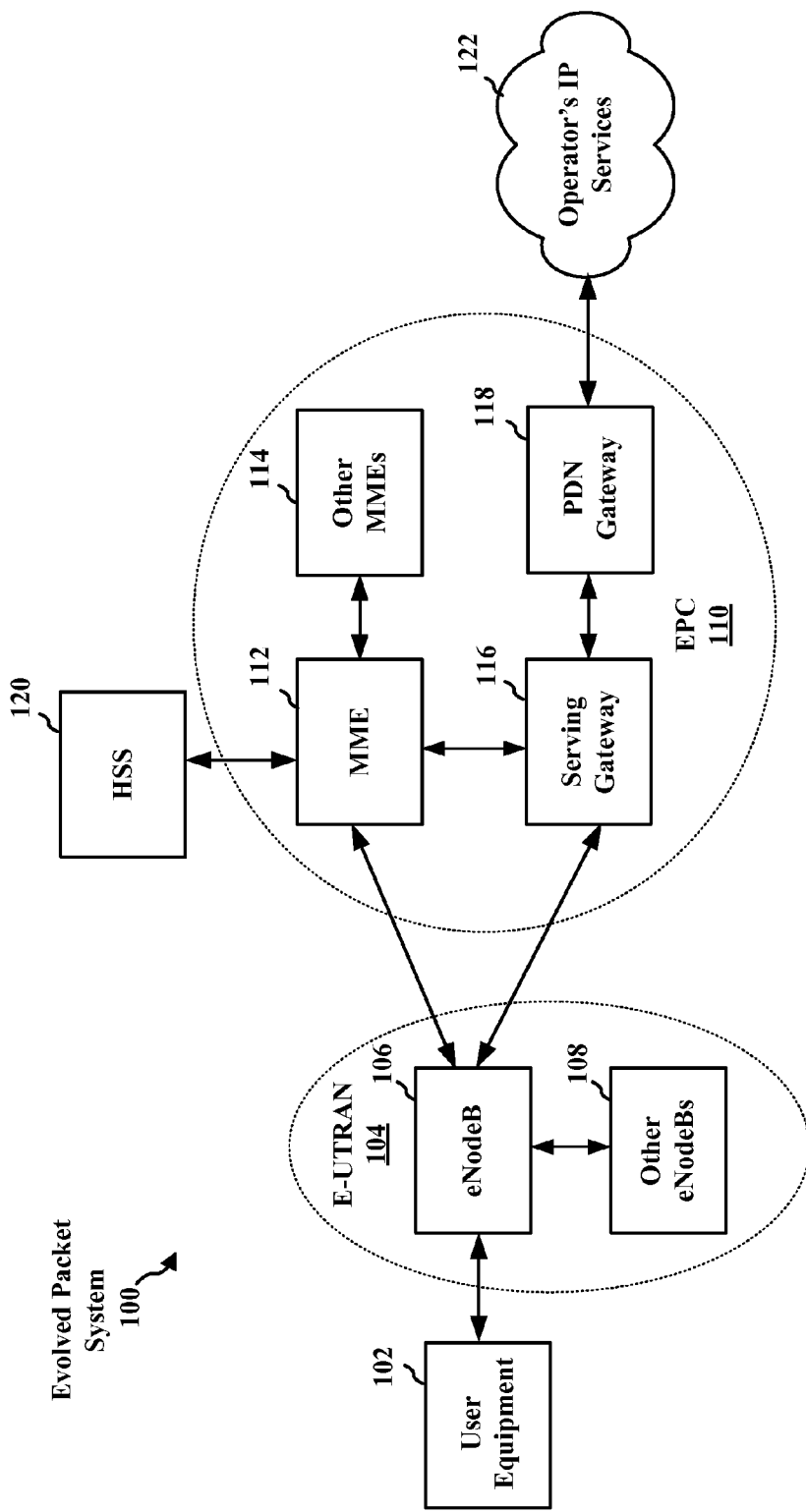
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
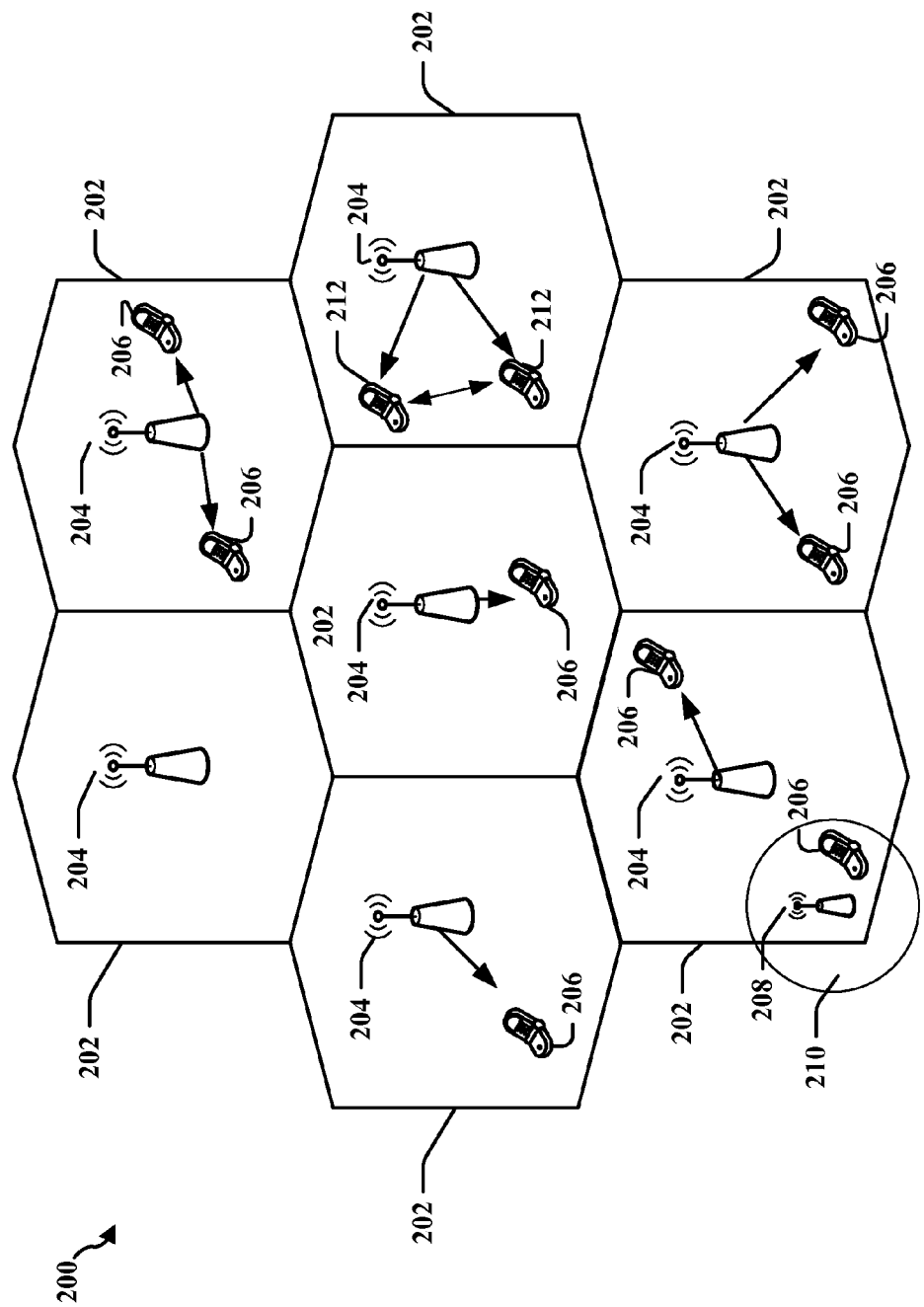
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206, 212 in the cells 202. Some of the UEs 212 may be in device-to-device communication. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 3:
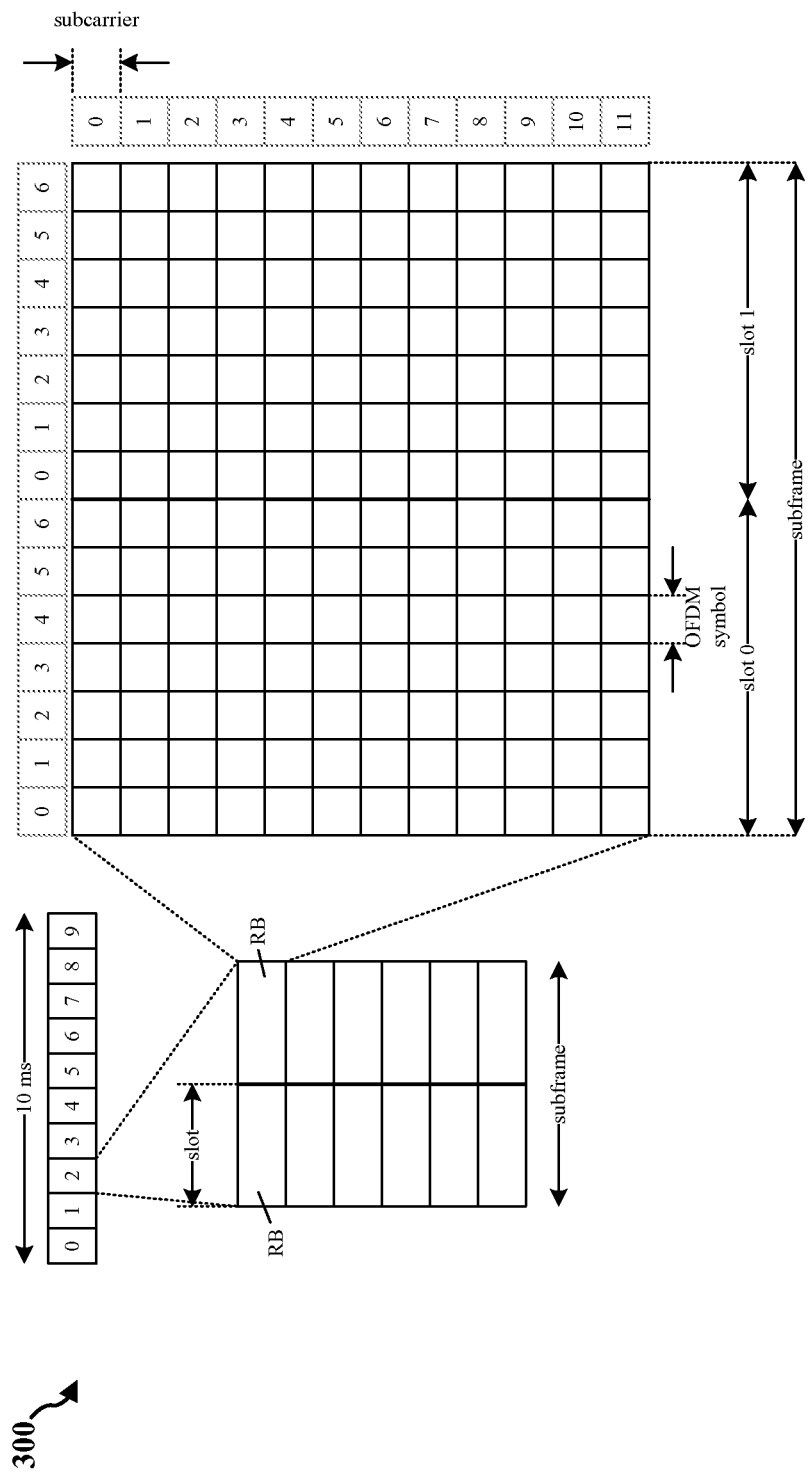
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. A physical DL control channel (PDCCH), a physical DL shared channel (PDSCH), and other channels may be mapped to the resource elements.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
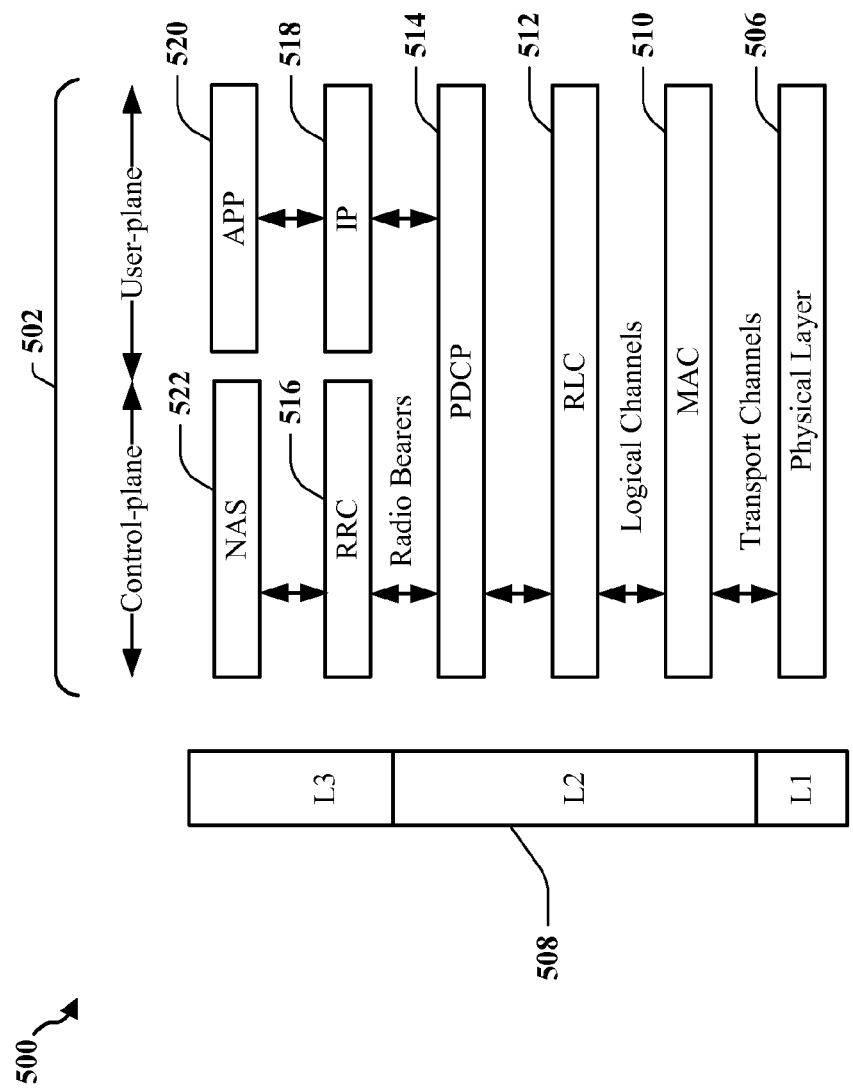
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the 502 UE and the eNB is shown with three layers: Layer 1, Layer 2, and Layer 3. Communication 522 of data/signaling may occur between UE 502 and an eNB across the three layers. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 and NAS sublayer 522 in Layer 3 (L3 layer). The RRC sublayer 516 is responsible for obtaining radio resources (i.e., radio bearers) and for configuring the lower layers using RRC signaling between the eNB and the UE 502. The NAS sublayer 522 is responsible for supporting session management procedures to establish and maintain IP connectivity for the UE 502 and support control plane communications between UE 502 and a MME at the radio interface. The NAS sublayer 522 provides protocols that support of mobility between the UE 502 and a packet data network gateway (PDN GW). NAS sublayer 522 protocols may be used to perform EPS bearer management, authentication, EPS Connection Management (ECM)-IDLE mobility handling, Paging origination in ECM-IDLE, security control, etc.

The user plane also includes an internet protocol (IP) sublayer 518 and an application sublayer 520. The IP sublayer 518 and application sublayer 520 are responsible for supporting communication of application data between the eNB 504 and the UE 502.

Figure 6:
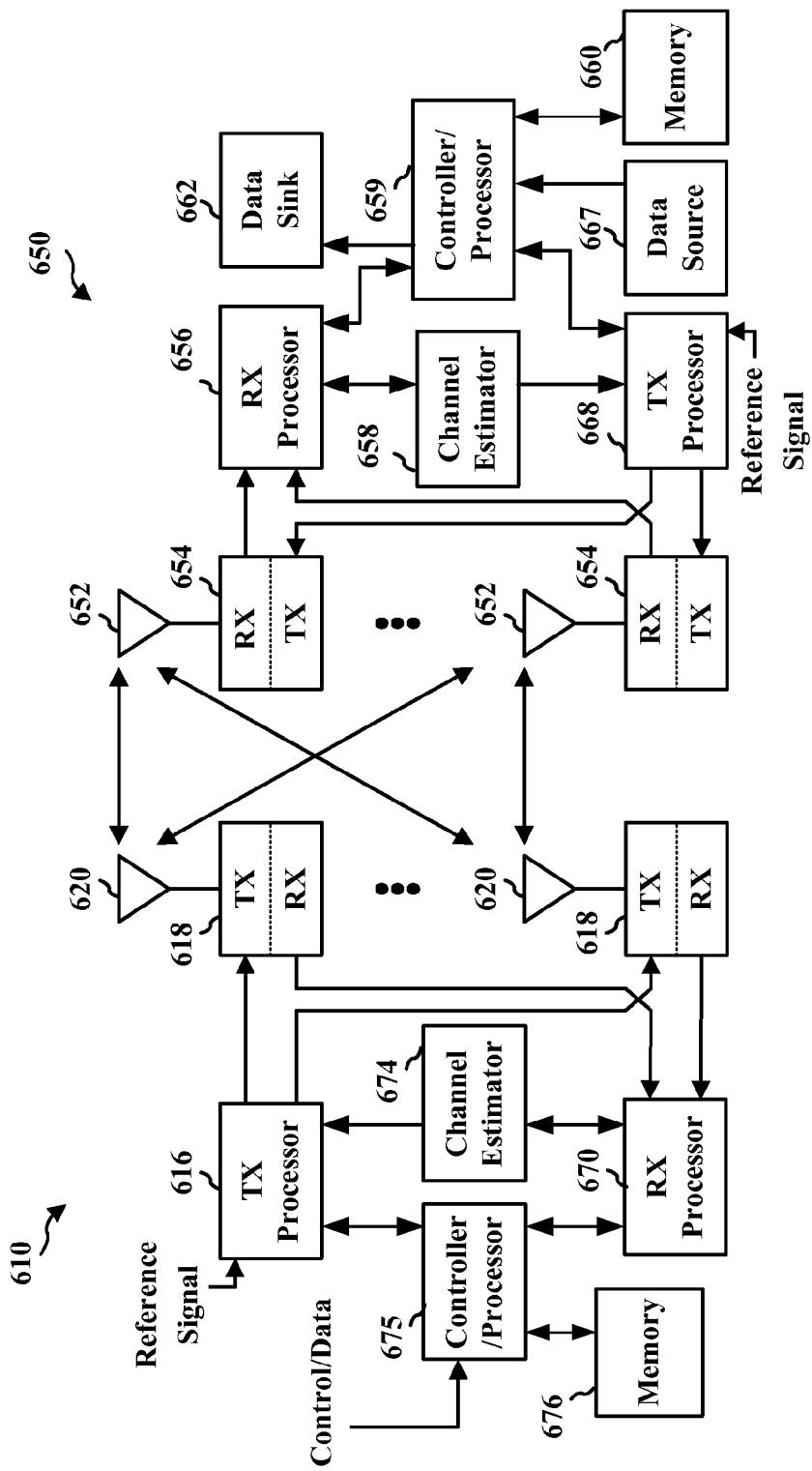
FIG. 6 is a diagram illustrating an example of an evolved Node B and user equipment in an access network.

FIG. 6 is a block diagram of a WAN entity (e.g., eNB, MME, etc.) 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the WAN entity 610. These soft decisions may be based on channel estimates computed by the channel estimator 658. The soft decisions are then decoded and deinterleaved to recover the data and control signals that were originally transmitted by the WAN entity 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the WAN entity 610, the controller/processor 659 implements the L2 layer for the user plane and the control plane by providing header compression, ciphering, packet segmentation and reordering, and multiplexing between logical and transport channels based on radio resource allocations by the WAN entity 610. The controller/processor 659 is also responsible for HARQ operations, retransmission of lost packets, and signaling to the WAN entity 610.

Channel estimates derived by a channel estimator 658 from a reference signal or feedback transmitted by the WAN entity 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the WAN entity 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
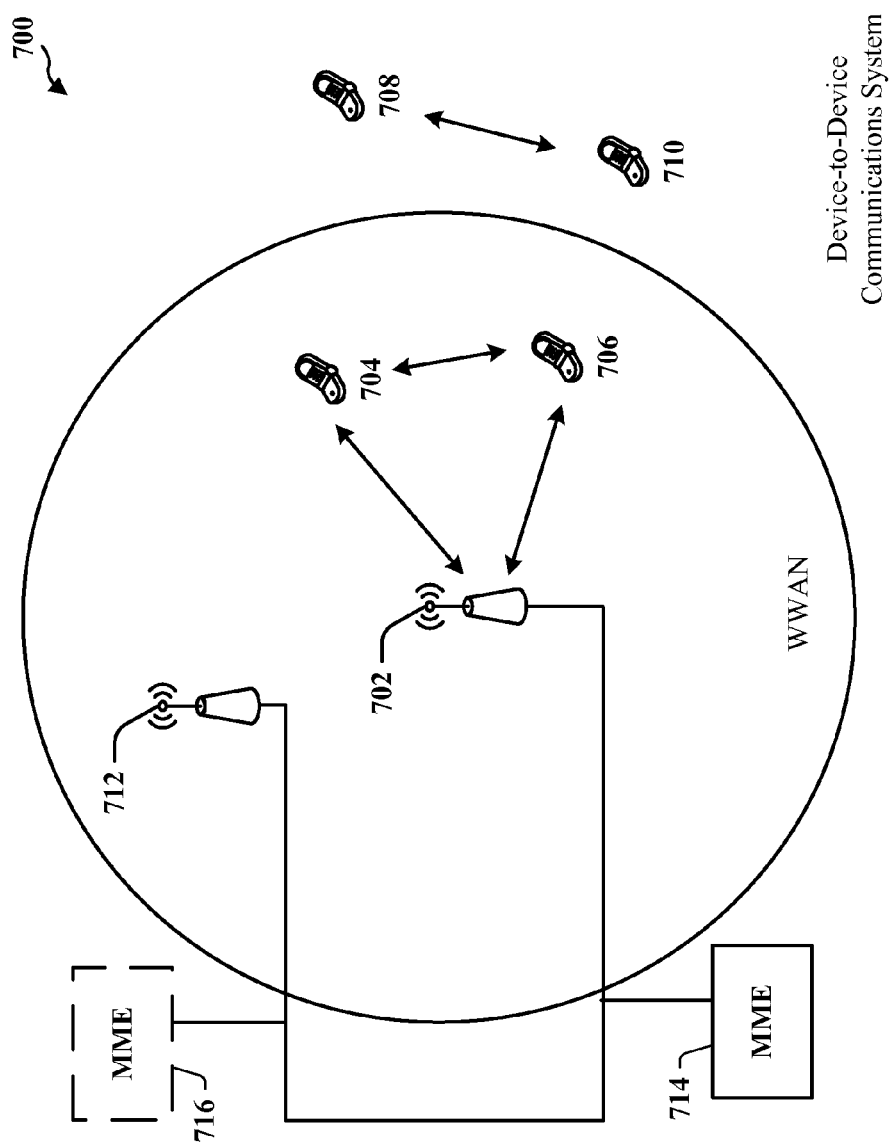
FIG. 7 is a diagram illustrating a device-to-device communications network.

FIG. 7 is a diagram of a device-to-device communications system 700. The device-to-device communications system 700 includes a plurality of wireless devices 704, 706, 708, 710, one or more base stations (eNodeBs 702, 712) and one or more MMEs (714, 716).

The device-to-device communications system 700 may overlap with a cellular communications system, such as for example, a wireless wide area network (WWAN). Some of the wireless devices 704, 706, 708, 710 may communicate together in device-to-device communication using the DL/UL WWAN spectrum, some may communicate with base station 702 and/or base station 712, and some may do both. In another aspect, the WWAN may include multiple base stations (702, 712) that may provide a coordinated communications environment through connectivity provided via one or more network entities (e.g., MMEs 714, 716).

For example, as shown in FIG. 7, the wireless devices 708, 710 are in device-to-device communication and the wireless devices 704, 706 are in device-to-device communication. The wireless devices 704, 706 are also communicating with the base station 702.

In an operational aspect, device 704 and device 706 may perform secure D2D communications using keys generated through assistance from MME 714 and/or MME 716.

FIGS. 8, 9, 10, 11, and 14 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 8:
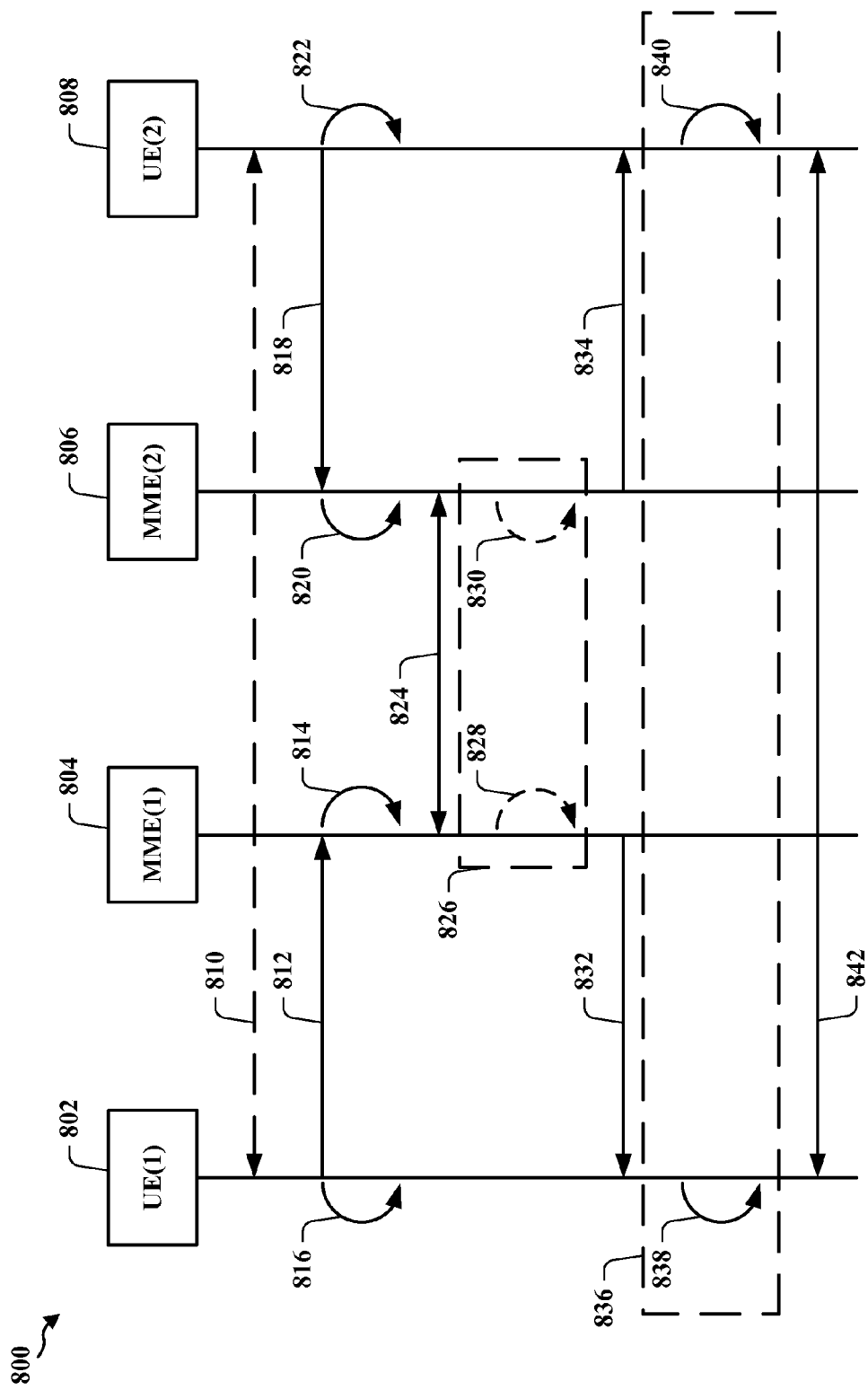
FIG. 8 is a call flow diagram illustrating a first method for secure device-to-device communications in a network.

FIG. 8 is a call flow diagram of a communications network 800 including a first UE 802 (UE(1)), a MME 804 (MME(1)) serving the first UE, a MME 806 (MME(2)) serving a second UE, and the second UE 808 (UE(2)). Although two MMEs are shown in communications network 800, one of ordinary skill in the art would recognize that the method described in the call flow diagram may be performed by any number of MMEs, alone or in combination.

At act 810, UE(1) 802 and UE(2) 808 may decide to attempt to establish a secure D2D communications link. At act 812, UE(1) 802 may send a NAS message to MME(1) 804 indicating that an intent to establish a shared key with UE(2) 808. At act 814, MME(1) 804 may calculate a first UE key from K_ASME_A, an uplink COUNT value of the received NAS message and at least a portion of the contextual information associated with communication with the second UE. In such an aspect, the contextual information may include a radio network temporary identifier (RNTI) of the first UE and/or second UE, an expression identifier, a service identifier, a transaction identifier, etc. At act 816, UE(1) 802 may calculate the first UE Key from the same values.

Similarly, at act 818, UE(2) 808 may send a NAS message to MME(2) indicating intent to establish a shared key with UE(1) 802. At act 820, MME(2) may calculate a second UE key from K_ASME_B, an uplink COUNT value of the received NAS message and at least a portion of the contextual information. At act 822, UE(2) 808 may calculate the second UE Key from the same values.

At act 824, where there are multiple MMEs as described in the depicted call flow diagram, MME(1) may provide MME (2) with the first UE key and an identifier for UE(1) 802. Further, MME(2) may provide MME(1) with the second UE key and an identifier for UE(2) 808.

An optional aspect is described in box 826. At act 828, MME(1) 804 may calculate a final UE key from the first UE Key and the second UE Key. Further, at act 830, MME(2) 806 may also calculate the final UE key from the first UE key and the second UE key. In another aspect, one of the MMEs (804, 806) may calculate the final UE key and send the final UE key to the other MME.

At act 832, MME(1) 804 may send at least confirmation that the second UE(2) was contacted. In an aspect, MME(1) 804 may send the second UE key to the first UE(1) 802. In another aspect, MME(1) 804 may send the final UE key to the first UE. Similarly, at act 834, MME(2) 806 may send the first UE key to the second UE(2) 808. In an aspect, MME(2) 806 may send the final UE key to the second UE(2) 808.

Another optional aspect is described in block 836. At act 838, UE(1) 802 may calculate a final UE key based at least on the first UE key. In another aspect, the UE(1) 802 may calculate the final UE key based on the first UE key and the second UE key. Similarly, at act 840, UE(2) 808 may calculate the final UE key based on the first UE key and the second UE key.

Thereafter, at act 842, UE(1) 802 and UE(2) 808 may perform secure D2D communications.

Figure 9:
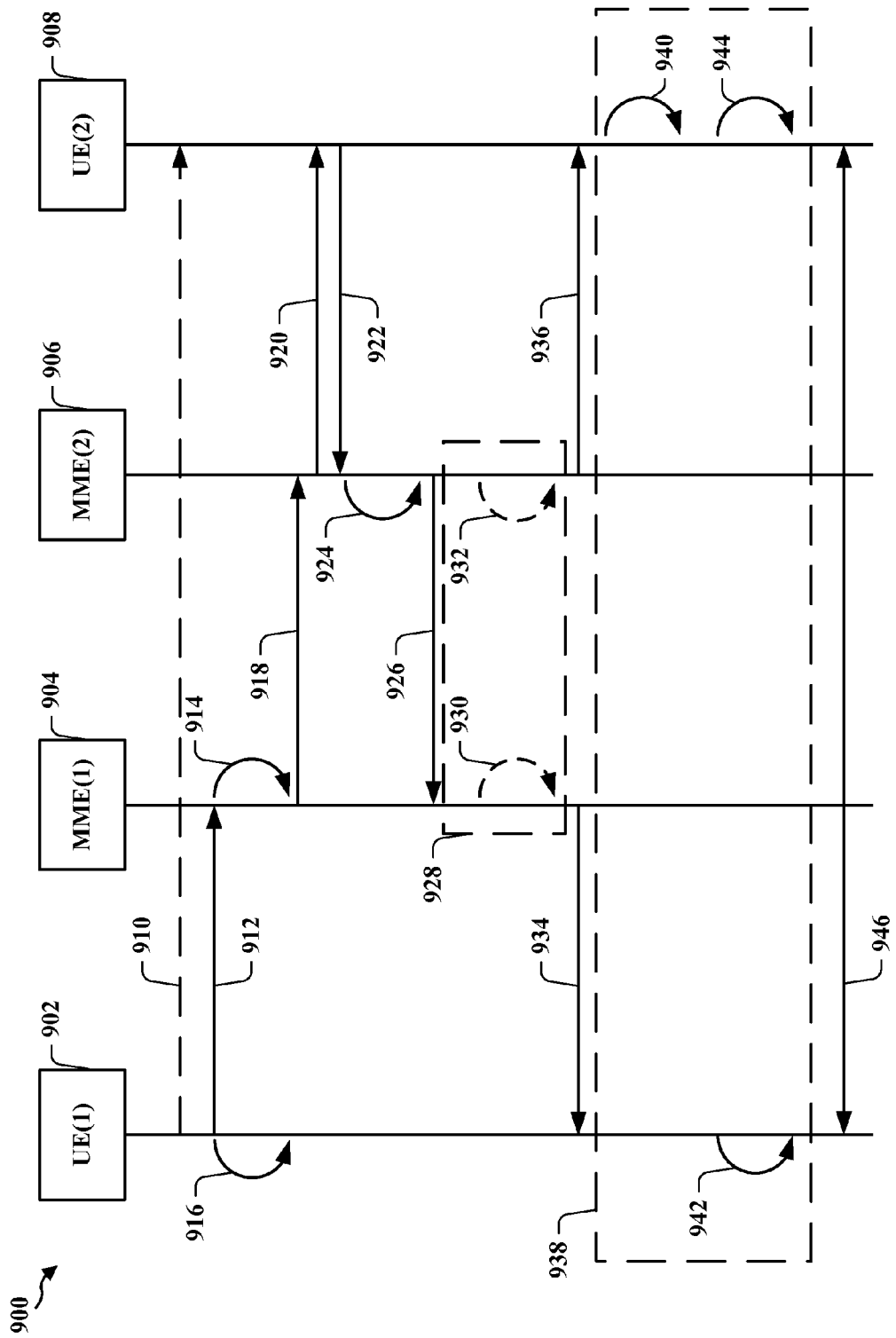
FIG. 9 is a call flow diagram illustrating a second method for secure device-to-device communications in a network.

FIG. 9 is another call flow diagram of a communications network 900 including a first UE 902 (UE(1)), a MME 904 (MME(1)) serving the first UE, a MME 906 (MME(2)) serving a second UE, and the second UE 908 (UE(2)). Although two MMEs are shown in communications network 900, one of ordinary skill in the art would recognize that the method described in the call flow diagram may be performed by any number of MMEs, alone or in combination.

At act 910, UE(1) 902 may detect the presence of UE(2) 908 and may decide to attempt to establish a secure D2D communications link with UE(2) 908. At act 912, UE(1) 902 may send a NAS message to MME(1) 904 indicating that an intent to establish a shared key with UE(2) 908. At act 914, MME(1) 904 may calculate a first UE key from K_ASME_A, an uplink COUNT value of the received NAS message and at least a portion of the contextual information associated with communication with the second UE. In such an aspect, the contextual information may include a radio network temporary identifier (RNTI) of the first UE and/or second UE, an expression identifier, a service identifier, a transaction identifier, etc. At act 916, UE(1) 902 may calculate the first UE Key from the same values.

At act 918, MME(1) 904 may provide MME(2) with the first UE key and a second UE(2) 908 identifier. At act 920, MME(2) 906 may page UE(2) 908, and at act 922, UE(2) may respond to the page. In an aspect, UE(2) 908 may respond with a NAS message.

At act 924, MME(2) 906 may calculate a second UE key from K_ASME_B, an uplink COUNT value of the received NAS message or a downlink COUNT of the NAS message that is sent at act 936, and at least a portion of the contextual information. At act 926, the second UE key may be sent from MME(2) 906 to MME(1) 904.

An optional aspect is described in box 928. At act 930, MME(1) 904 may calculate a final UE key from the first UE Key and the second UE Key. Further, at act 932, MME(2) 906 may also calculate the final UE key from the first UE key and the second UE key. In another aspect, one of the MMEs (904, 906) may calculate the final UE key and send the final UE key to the other MME.

At act 934, MME(1) 904 may send at least confirmation that the second UE(2) 908 was contacted. In an aspect, MME (1) 904 may send the second UE key to the first UE(1) 902. In another aspect, MME(1) 904 may send the final UE key to the first UE. Similarly, at act 936, MME(2) 906 may send the first UE key to the second UE(2) 908. In an aspect, MME(2) 906 may send the final UE key to the second UE(2) 908.

Another optional aspect is described in block 938. At act 940, UE(2) 908 may calculate a second UE key from K_ASME_B, an uplink COUNT value of the transmitted NAS message and/or a downlink COUNT value of the received NAS message, and at least a portion of the contextual information. At act 940, UE(1) 902 may calculate a final UE key based at least on the first UE key. In another aspect, the UE(1) 902 may calculate the final UE key based on the first UE key and the second UE key. Similarly, at act 944, UE(2) 908 may calculate the final UE key based on the first UE key and the second UE key.

Thereafter, at act 946, UE(1) 902 and UE(2) 908 may perform secure D2D communications.

Figure 10:
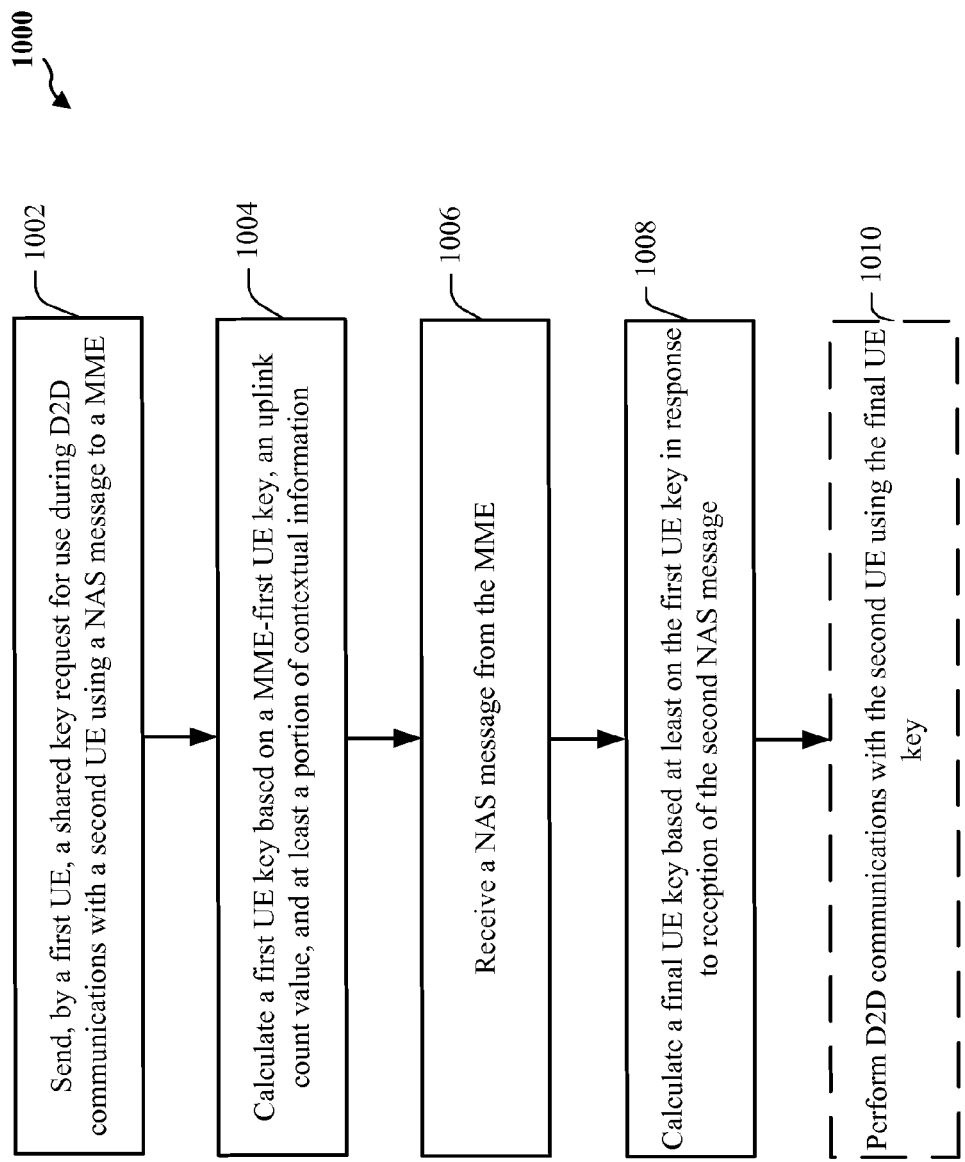
FIG. 10 is a flow chart of a first method of wireless communication.

FIG. 10 is a flow chart 1000 of a first method of wireless communication. The method may be performed by a UE.

At block 1002, the UE may send a shared key request for use during D2D communications with a second UE using a NAS message to a MME. In an aspect, the first NAS message may indicate an uplink count value. The NAS message may also includes at least a portion of contextual information associated with communication with a second UE. In such an aspect, the contextual information may include a radio network temporary identifier (RNTI) of the first UE and/or second UE, an expression identifier, a service identifier, a transaction identifier, etc. In another aspect, the MME may include a first MME associated with the first UE and a second MME associated with the second UE.

At block 1004, the UE may calculate a first UE key. In an aspect, the first UE key may be based on a MME-first UE key that is shared between the MME and the first UE, the uplink count value, and at least a portion of the contextual information. In such an aspect, the MME-first UE key may be an access security management entity (ASME) key (K_ASME).

At block 1006, the UE may receive a NAS message from the MME. In an aspect, the NAS message may at least indicate successful contact with the second UE. In an aspect, received NAS message may also include a second UE key. In such an aspect, the second UE key may be generated using a MME-second UE key, a count for a NAS message associated with the second UE, and at least a portion of the contextual information. In another aspect, the NAS message may include a final UE key generated by the MME using the first UE key and a second UE key. Further, the at least a portion of the contextual information may be sent by the first UE with the shared key request.

At block 1008, the UE may calculate a final UE key based at least on the first UE key in response to reception of the second NAS message. In an aspect in which the second NAS message includes the second UE key, the final UE key may be calculated based on both the first UE key and the second UE key.

In an optional aspect, at block 1010, first UE may perform secure D2D communications with the second UE using the final UE key.

Figure 11:
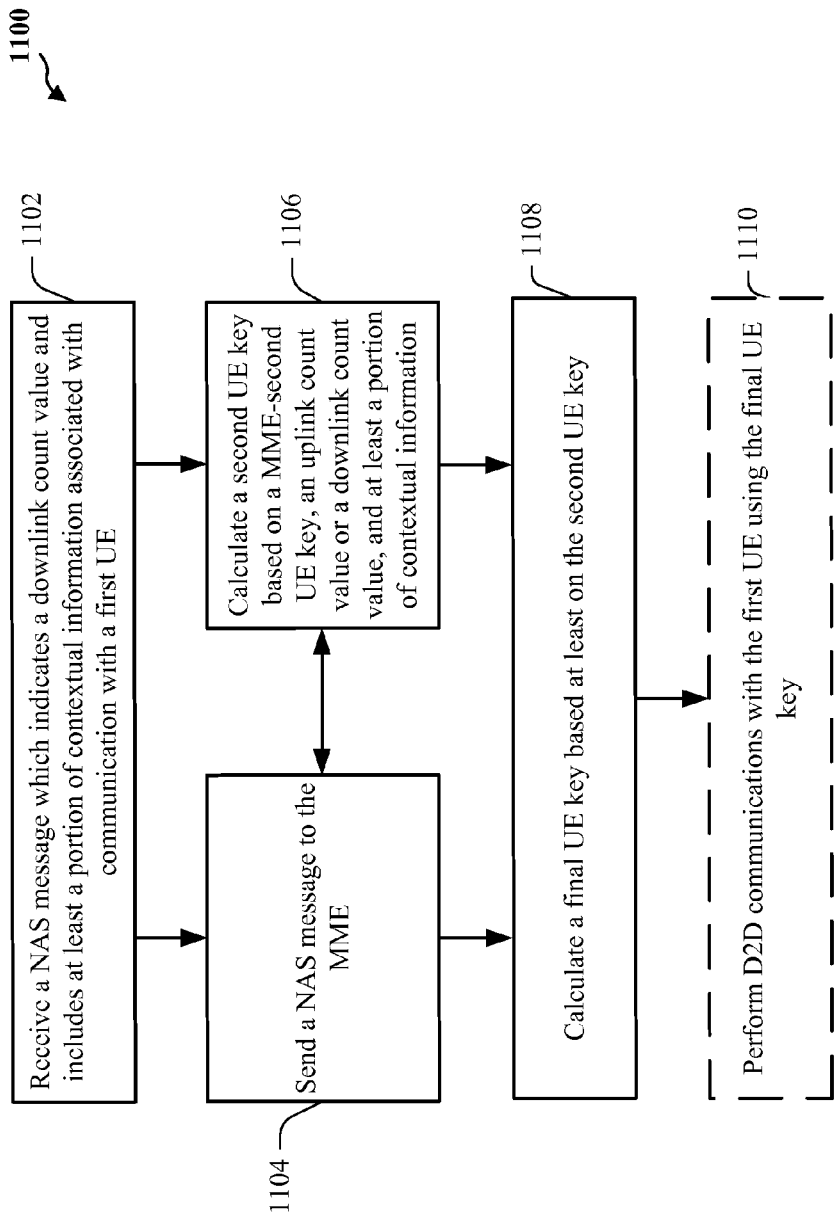
FIG. 11 is a flow chart of a second method of wireless communication.

FIG. 11 is a flow chart 1100 of a second method of wireless communication. The method may be performed by a UE.

At block 1102, the UE may receive a NAS message, which indicates a downlink count value and includes at least a portion of contextual information associated with communication with a first UE. In such an aspect, the contextual information may include, a first UE identifier such as a RNTI of the first UE, an expression identifier, a service identifier, a transaction identifier, etc. In another aspect, the MME may include a first MME associated with the first UE and a second MME associated with the second UE.

At block 1104, the UE may send a second NAS message to the MME. Additionally or in the alternative, at block 1106, the UE may calculate a second UE key. In an aspect, the second UE key may be based on a MME-second UE key, an uplink count value associated with the second NAS message and/or the downlink count value, and at least a portion of the contextual information. In such an aspect, the MME-second UE key may be a K_ASME. In an aspect in which the second UE key is calculated at block 1106, then at block 1104, the UE may send the second UE key with the NAS message. In another aspect, the UE may send the NAS message before receiving the NAS message which indicates the downlink count value.

At block 1108, the UE may calculate a final UE key based at least on the second UE key. In an aspect, in which the first NAS message includes a first UE key, then the UE may calculate the final UE key based on both the first and second UE keys.

In an optional aspect, at block 1110, second UE may perform secure D2D communications with the first UE using the final UE key.

Figure 12:
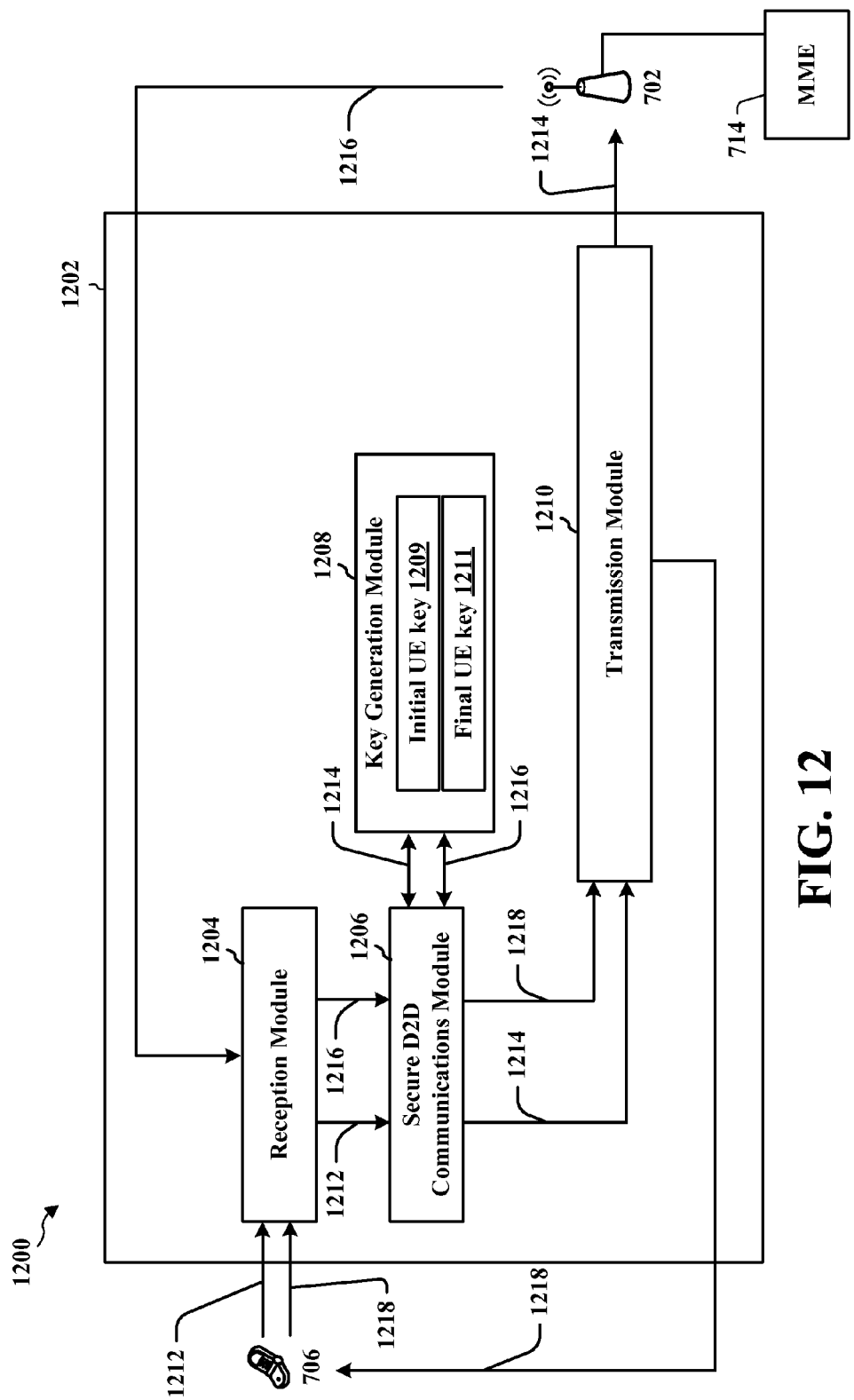
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus may be a UE.

The apparatus 1202 includes a reception module 1204 that may receive an indication 1212 that another UE 706 is available for secure D2D communications 1218. In an aspect, the indication may include information associated with the other UE 706, such as but not limited to, a RNTI of the second UE 706, an expression identifier, a service identifier, or a transaction identifier.

Apparatus 1202 may further include secure D2D communications module 1206 and key generation module 1208. In an aspect, secure D2D communications module may generate a shared key request using a NAS message 1214 for transmission by transmission module 1210 to an MME 714 via an eNodeB 702. In such an aspect, key generate module 1208 may use an uplink count associated with the NAS message 1214, along with at least a portion of the contextual information associated with the second UE 706 and a MME-first UE key, to generate an initial UE key 1209. As used herein, an initial UE key 1209 may be referenced to as a first UE key with respect to a first UE and a second UE key with respect to a second UE.

Reception module 1204 may further receive a message and/or page 1216 associated to the secure D2D setup process. In an aspect in which the UE 1202 is discovered by another UE 706, the received message 1216 may be a page indicating the other UEs interest. In an aspect in which the UE 1202 sent a shared key request using the NAS message 1214, the received message 1216 may indicate at least that the second UE 706 has successfully been contacted. In another aspect, the message 1216 may include a second UE key. In such an aspect, the second UE key may be generated using a MME-second UE key, a count for a NAS message associated with the second UE, and at least a portion of the contextual information. Further, the at least a portion of the contextual information may be sent by the first UE with the shared key request message 1214. Key generation module 1208 may use at least the reception of the message 1216 to prompt generation of a final UE key 1211 for using during secure D2D communications 1218. In another aspect where the message includes the second UE key, then key generation module 1208 may generate the final UE key based on the initial UE key 1209 and the second UE key.

The apparatus may include additional modules that perform each of the steps of the algorithm in the aforementioned flow charts of FIGS. 10 and 11. As such, each step in the aforementioned flow charts of FIGS. 10 and 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
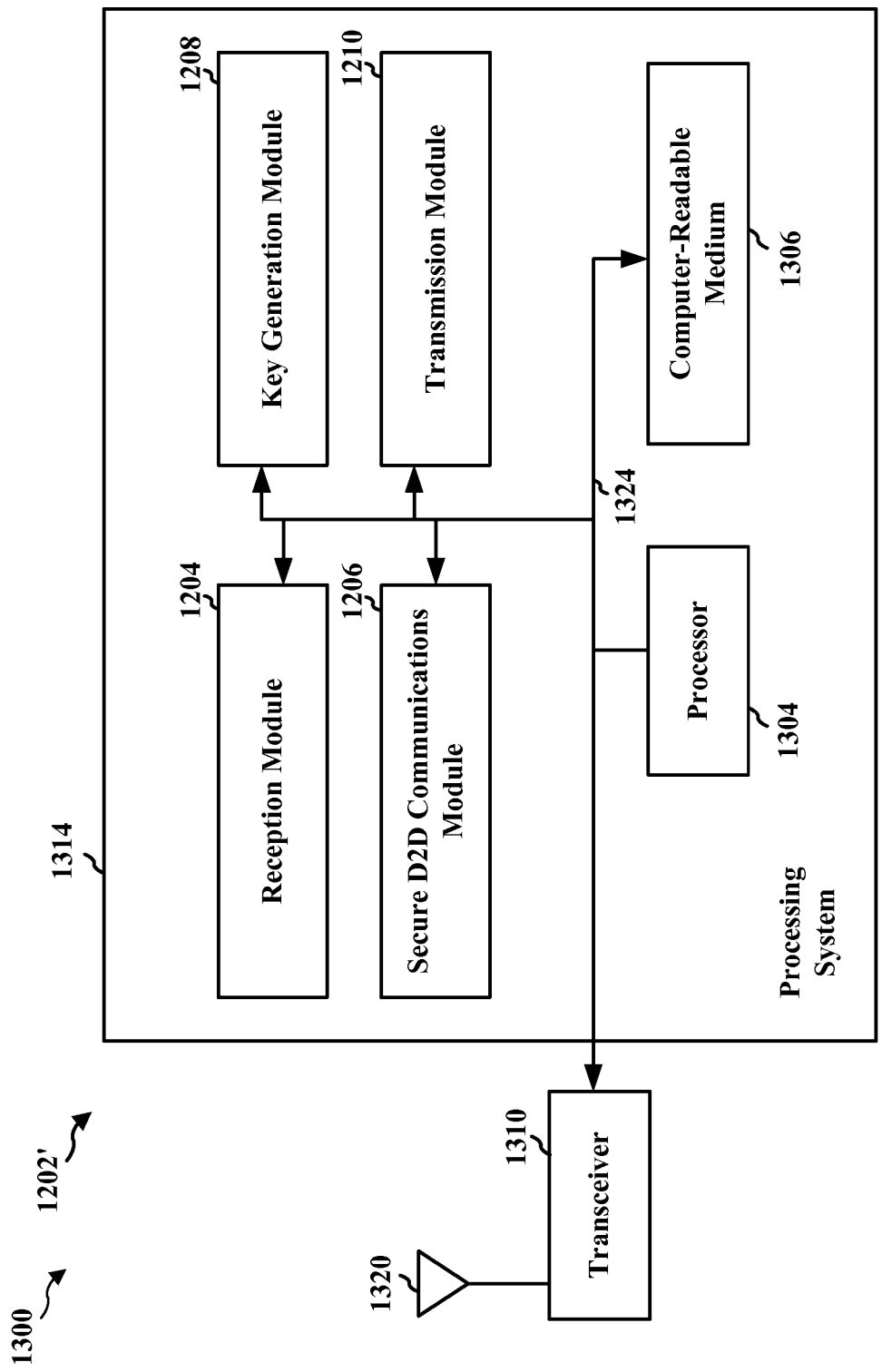
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1204, 1206, 1208, and 1210. The modules may be software modules running in the processor 1304, resident/stored in the computer readable medium 1306, one or more hardware modules coupled to the processor 1304, or some combination thereof. The processing system 1314 may be a component of the UE 650 and may include the memory 660 and/or at least one of the TX processor 668, the RX processor 670, and the controller/processor 659.

In one configuration, the apparatus 1202/1202' for wireless communication includes means for sending, by a first UE, a shared key request using a first NAS message to a MME, means for calculating a first UE key based on a MME-first UE key that is shared between the MME and the first UE, the uplink count value, and at least a portion of contextual information associated with communication with a second UE, means for receiving a second NAS message from the MME, and means for calculating a final UE key in response to receiving the second NAS message based at least on the first UE key. In an aspect, the first NAS message may indicate an uplink count value and may include at least a portion of the contextual information associated with communication with the second UE. In another configuration, the apparatus 1202/1202' for wireless communication includes means for receiving a first NAS message, by a second UE, which indicates a downlink count value and includes at least a portion of contextual information, means for sending a second NAS message, means for calculating a second UE key based on a MME-second UE key that is shared between the MME and the second UE, at least one of an uplink count value associated with the second NAS message or the downlink count value, and the at least a portion of the contextual information, and means for calculating a final UE key based at least on the second UE key. The apparatus 1202/1202' may further include means for performing secure D2D communications with another UE using the final UE key.

The aforementioned means may be one or more of the aforementioned modules of the apparatus 1202 and/or the processing system 1314 of the apparatus 1202' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Figure 14:
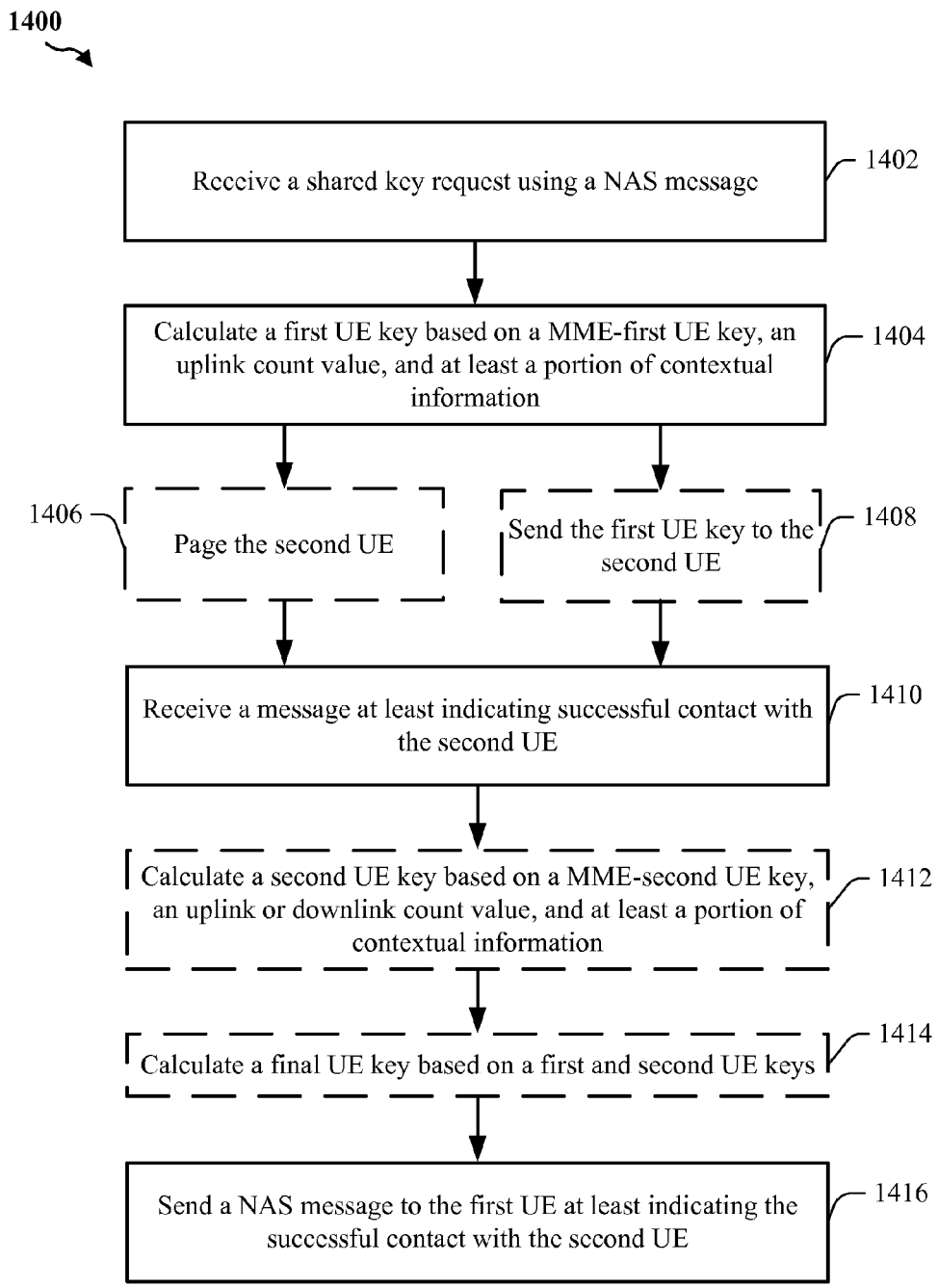
FIG. 14 is a flow chart of a third method of wireless communication.

FIG. 14 is a flow chart 1400 of a third method of wireless communication. The method may be performed by a MME. In an aspect, the method may be performed by a single MME that supports both a first UE and a second UE. In another aspect, the method may be performed by a first MME associated with the first UE and a second MME associated with the second UE.

At block 1402, the MME may receive a shared key request using a first NAS message. In an aspect, the first NAS message may indicate an uplink count value and may include at least a portion of contextual information associated with communication with a second UE. In an aspect, the contextual information may include a RNTI, an expression identifier, or service identifier, a transaction identifier, etc.

At block 1404, the MME may calculate a first UE key. In an aspect, the first UE key may be based on a MME-first UE key that is shared between the MME and the first UE, the uplink count value, and the at least a portion of the contextual information. In such an aspect, the MME-first UE key may be a K_ASME.

In an optional aspect, where the second UE is unaware of the first UE, at block 1406, the MME may send instructions to page to the second UE to inform it that another UE is interested in secure D2D communications.

In another optional aspect, at block 1408, the MME may send the calculated first UE key to the second UE. In an aspect, the message may be a NAS message. The NAS message may indicate a downlink count value.

At block 1410, the MME may receive a message at least indicating successful contact with the second UE. In an aspect, the message may be a NAS message. The NAS message may indicate an uplink count value. In another optional aspect, the MME may send the calculated first UE key to the second UE, as describe in block 1408, after the MME receives the message at least indicating successful contact with the second UE.

In an optional aspect, at block 1412, the MME may calculate a second UE key. In such an aspect, the second UE key may be calculated based on using a MME-second UE key, a count value for a NAS message associated with the second UE, and at least a portion of the contextual information. In such an aspect, the count value may be an uplink count value and/or a downlink count value.

In a further optional aspect, at block 1414, the MME may use the first UE key and the second UE key to calculate a final UE key.

At block 1416, the MME may send a NAS message to the first UE at least indicating successful contact with the second UE. In an aspect in which the MME calculates the second UE key, the NAS message may include the second UE key. In an aspect, in which the MME also calculates the final UE key, then the NAS message may include the final UE key.

Figure 15:
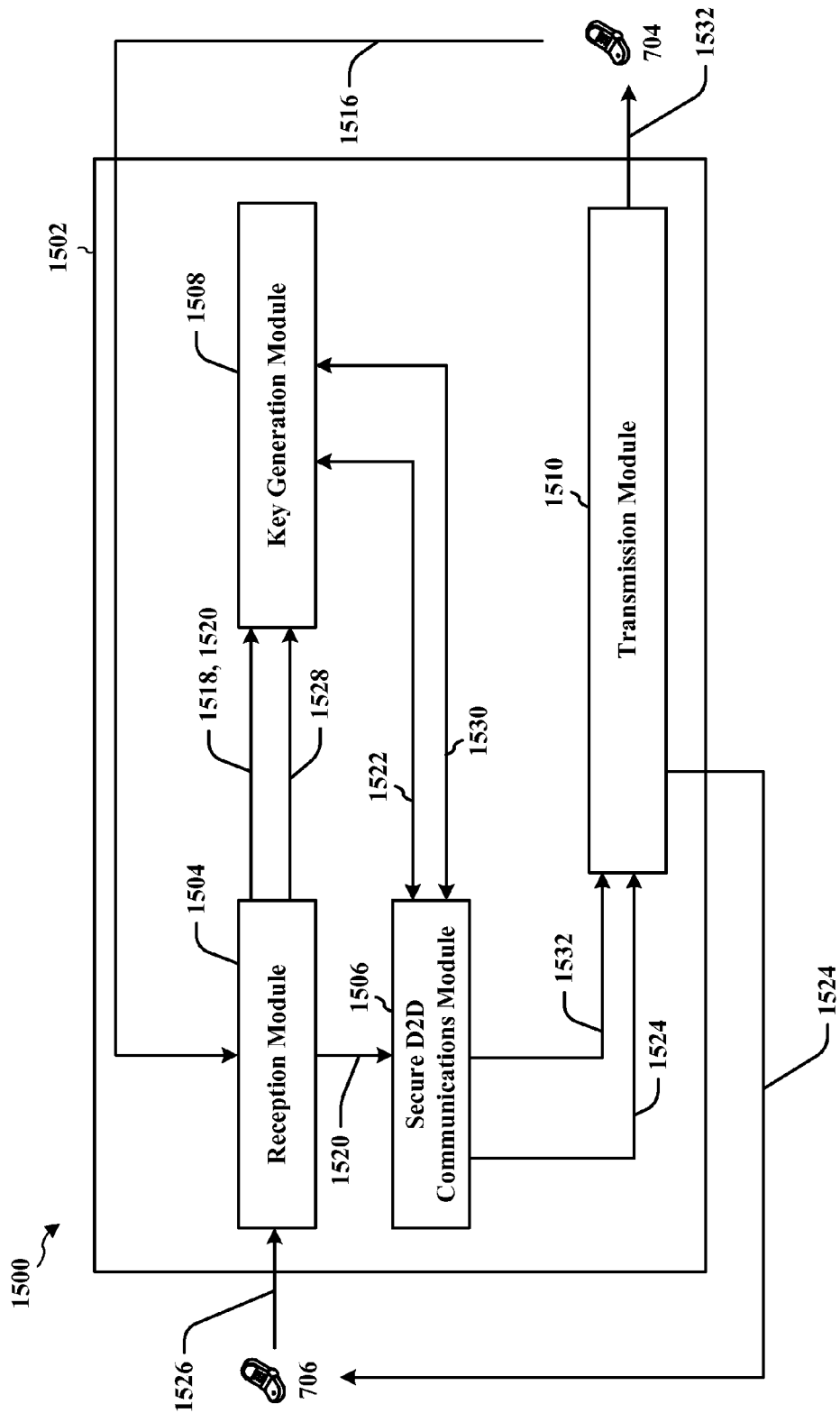
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus may be a MME.

The apparatus 1502 includes a reception module 1504 configured to receive a message 1516 from a first UE that indicates interest in establishing secure D2D communications with a second UE 706. In an aspect, the message 1516 may include contextual information 1520 associated with the first UE 704 and/or the second UE 706. In such an aspect, the contextual information 1520 may include a RNTI of the first UE, an expression identifier, a service identifier, a transaction identifier, etc. In another aspect, the message 1516 may be a NAS message with an uplink count value 1518.

Apparatus 1502 may further include secure D2D communications module 1506 and key generation module 1508. D2D communications module 1506 may determine the second UE 706 of interest, based at least in part of the contextual information 1520, and send a message 1524 via transmission module 1510. In an aspect, the message 1524 may be a paging message to indicate to the second UE 706 that the first UE is attempting to communicate. Key generation module 1508 may generate a first UE key 1522 using the NAS message uplink count value 1518, a MME-first UE key, and at least a portion of the contextual information 1520.

Reception module 1504 may be further configured to receive a message 1506 from the second UE 706. In an aspect, the message 1526 may be a NAS message. The NAS message may be indicated by an uplink count value. Further, key generation module 1508 may calculate a second UE key 1530. In an aspect, the second UE key may be calculated based on a MME-second UE key, a count value for a NAS message (1524, 1526) associated with the second UE 706, and at least a portion of contextual information. In such an aspect, the count value may be an uplink count value and/or a downlink count value.

Secure D2D communications module 1506 may be further configured to send a message 1532 through transmission module 1510 indicating at least successful contact with the second UE. In an aspect, the message 1532 may be a NAS message. In an aspect in which the apparatus 1502 calculates the second UE key 1530, the NAS message may include the second UE key 1530. In an aspect, in which the apparatus 1502 also calculates the final UE key, then the NAS message may include the final UE key.

The apparatus may include additional modules that perform each of the steps of the algorithm in the aforementioned flow charts of FIG. 14. As such, each step in the aforementioned flow charts of FIG. 14 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
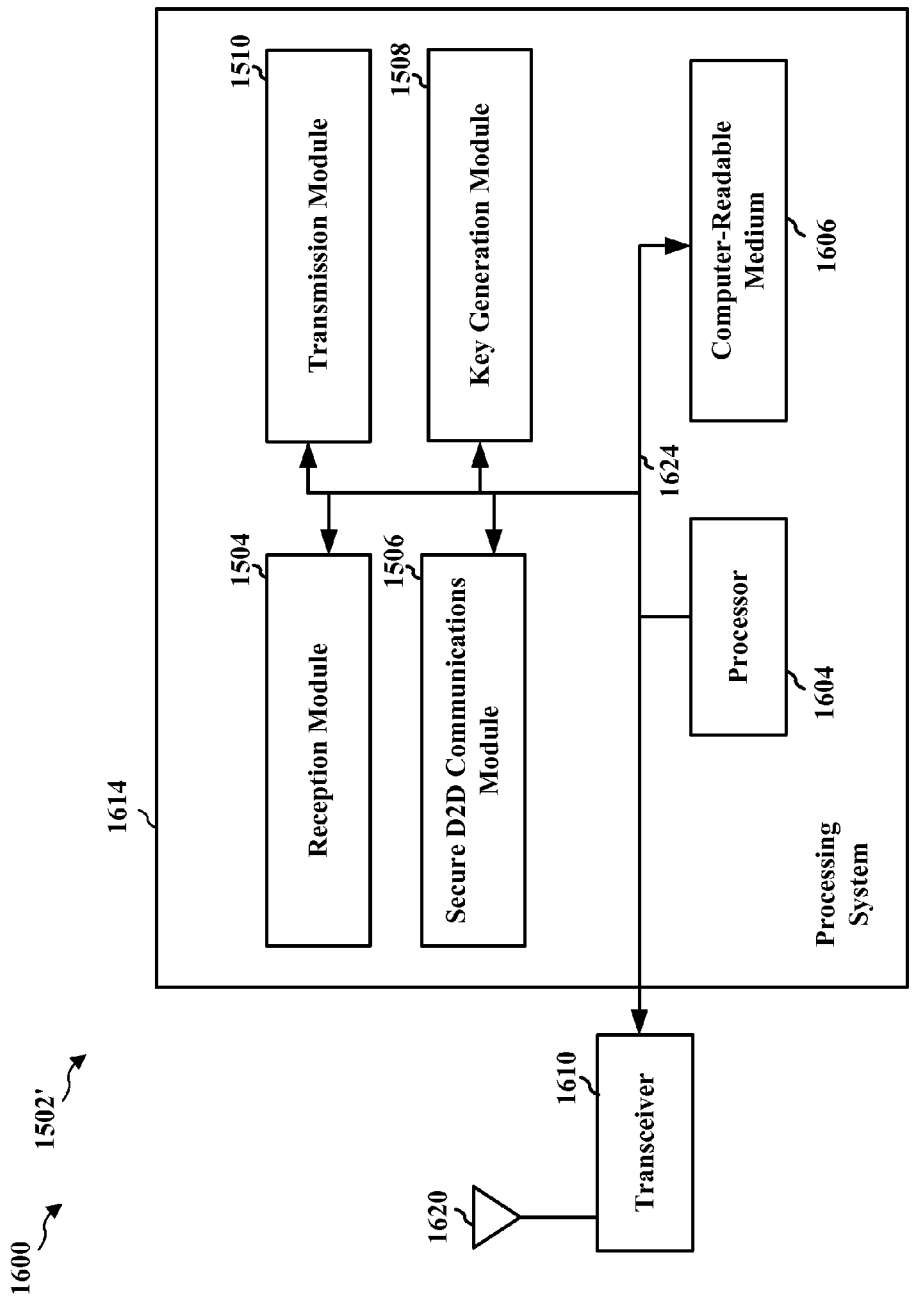
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1504, 1506, 1508, 1510, and the computer-readable medium 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The processing system 1614 includes a processor 1604 coupled to a computer-readable medium 1606. The processor 1604 is responsible for general processing, including the execution of software stored on the computer-readable medium 1606. The software, when executed by the processor 1604, causes the processing system 1614 to perform the various functions described supra for any particular apparatus. The computer-readable medium 1606 may also be used for storing data that is manipulated by the processor 1604 when executing software. The processing system further includes at least one of the modules 1504, 1506, 1508, and 1510. The modules may be software modules running in the processor 1604, resident/stored in the computer readable medium 1606, one or more hardware modules coupled to the processor 1604, or some combination thereof. The processing system 1614 may be a component of the WAN entity 610 (e.g., MME) and may include the memory 676 and/or at least one of the TX processor 616, the RX processor 670, and the controller/processor 675.

In one configuration, the apparatus 1502/1502' for wireless communication includes means for receiving, by a MME, a shared key request using a first NAS message, means for calculating a first UE key based on a MME-first UE key that is shared between the MME and a first UE, the uplink count value, and at least a portion of contextual information, means for receiving a message at least indicating successful contact with the second UE, and means for sending a second NAS message to the first UE at least indicating the successful contact with the second UE. In an aspect, the first NAS message may indicate an uplink count value and may include contextual information associated with communication with a second UE. In another aspect, the apparatus 1502/1502' includes means for sending the first UE key to the second UE. The aforementioned means may be one or more of the aforementioned modules of the apparatus 1502 and/or the processing system 1614 of the apparatus 1502' configured to perform the functions recited by the aforementioned means. As described supra, the processing system 1614 may include the TX Processor 616, the RX Processor 670, and the controller/processor 675. As such, in one configuration, the aforementioned means may be the TX Processor 616, the RX Processor 670, and/or the controller/processor 675 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications, comprising:
   sending, by a first user equipment (UE), a shared key request using a first non-access stratum (NAS) message to a first mobility management entity (MME), wherein the first NAS message indicates an uplink count value and includes at least a portion of contextual information associated with communication with a second UE;
   calculating a first UE key based on a MME-first UE key that is shared between the MME and the first UE, the uplink count value, and the at least a portion of the contextual information;
   receiving a second NAS message, which includes a second UE key calculated by the second UE or by a second MME associated with the second UE, from the first MME; and
   calculating a final UE key based at least on the first UE key in response to reception of the second NAS message.

2. The method of claim 1, wherein the final UE key is calculated further based on the second UE key.

3. The method of claim 2, wherein the second UE key is generated using a MME-second UE key, a count for a NAS message associated with the second UE, and at least a portion of the contextual information.

4. The method of claim 3, wherein the at least a portion of the contextual information is sent with the shared key request.

5. The method of claim 1, further comprising:
   performing device-to-device (D2D) communications with the second UE using the final UE key.

6. The method of claim 1, wherein the MME-first UE key comprises an access security management entity (ASME) key (K_ASME).

7. The method of claim 1, wherein the contextual information comprises at least one of: a first UE identifier, a radio network temporary identifier (RNTI) of the first UE or second UE, an expression identifier, a service identifier, or a transaction identifier.

8. The method of claim 1, wherein the first MME is associated with the first UE.

9. A method of communications, comprising:
   receiving from an MME a first non-access stratum (NAS) message, by a second user equipment (UE), which indicates a downlink count value and includes at least a portion of contextual information associated with communication with a first UE;
   sending a second NAS message;
   calculating a second UE key based on a MME-second UE key that is shared between the MME and the second UE, at least one of an uplink count value associated with the second NAS message or the downlink count value, and the at least a portion of the contextual information; and
   calculating a final UE key based at least on the second UE key.

10. The method of claim 9, wherein a first NAS message includes the first UE key and wherein the final UE key is calculated further based on the first UE key.

11. The method of claim 9, wherein the MME-second UE key comprises an access security management entity (ASME) key (K_ASME).

12. The method of claim 9, wherein the contextual information comprises at least one of: a radio network temporary identifier (RNTI) of the first UE, an expression identifier, a service identifier, or a transaction identifier.

13. The method of claim 9, wherein the MME comprises a first MME associated with the first UE and a second MME associated with the second UE.

14. A method of communications, comprising:
receiving, by a mobility management entity (MME), a shared key request from a first UE using a first non-access stratum (NAS) message, wherein the first NAS message indicates an uplink count value and includes at least a portion of contextual information associated with communication with a second UE;
calculating a first UE key based on a MME-first UE key that is shared between the MME and the first UE, the uplink count value, and the at least a portion of the contextual information;
receiving a message at least indicating successful contact with the second UE; and
sending a second NAS message to the first UE at least indicating successful contact with the second UE.

15. The method of claim 14, further comprising sending the first UE key to the second UE.

16. The method of claim 14, wherein the message received from the second UE is a third NAS message including an uplink count value, and further comprising:
calculating a second UE key based on a MME-second UE key that is shared between the MME and the second UE, the uplink count value of the third NAS message from the second UE or the downlink count value of a NAS message sent to the second UE, and at least a portion of the contextual information.

17. The method of claim 16, wherein the sending further comprises:
paging the second UE to prompt the second UE to transmit the third NAS message; and
sending the first UE key and the at least a portion of the contextual information to the second UE.

18. The method of claim 16, wherein the second NAS message further includes the second UE key.

19. The method of claim 16, further comprising:
calculating a final UE key based on the first UE key and the second UE key; and
sending the final UE key to the first UE and the second UE using NAS messaging.

20. The method of claim 16, wherein the MME-first UE key comprises an access security management entity (ASME) key (K_ASME).

21. The method of claim 14, wherein the contextual information comprises at least one of: a radio network temporary identifier (RNTI), an expression identifier, service identifier, or a transaction identifier.

22. The method of claim 14, wherein the MME comprises a first MME associated with the first UE and a second MME associated with the second UE.

23. An apparatus for wireless communication, comprising:
means for sending, by a first user equipment (UE), a shared key request using a first non-access stratum (NAS) message to a first mobility management entity (MME), wherein the first NAS message indicates an uplink count value and includes at least a portion of contextual information associated with communication with a second UE;
means for calculating a first UE key based on a MME-first UE key that is shared between the MME and the first UE, the uplink count value, and the at least a portion of the contextual information;
means for receiving a second NAS message, which includes a second UE key calculated by the second UE or by a second MME associated with the second UE, from the first MME; and
means for calculating a final UE key based at least on the first UE key in response to reception of the second NAS message.

24. The apparatus of claim 23, wherein the final UE key is calculated further based on the second UE key.

25. The apparatus of claim 24, wherein the second UE key is generated using a MME-second UE key, a count for a NAS message associated with the second UE, and a at least a portion of the contextual information.

26. The apparatus of claim 25, wherein at least a portion of the contextual information is sent with the shared key request.

27. The apparatus of claim 23, further comprising:
means for performing device-to-device (D2D) communications with the second UE using the final UE key.

28. The apparatus of claim 23, wherein the MME-first UE key comprises an access security management entity (ASME) key (K_ASME).

29. The apparatus of claim 23, wherein the contextual information comprises at least one of: a first UE identifier, a radio network temporary identifier (RNTI) of the first UE or second UE, an expression identifier, a service identifier, or a transaction identifier.

30. The apparatus of claim 23, wherein the first MME is associated with the first UE.

31. An apparatus for wireless communications, comprising:
means for receiving from an MME a first non-access stratum (NAS) message, by a second user equipment (UE), which indicates a downlink count value and includes at least a portion of contextual information associated with communication with a first UE;
means for sending a second NAS message;
means for calculating a second UE key based on a MME-second UE key that is shared between the MME and the second UE, at least one of an uplink count value associated with the second NAS message or the downlink count value, and the at least a portion of the contextual information; and
wherein the means for calculating is further configured to calculate a final UE key based at least on the second UE key.

32. The apparatus of claim 31, wherein a first NAS message includes the first UE key and wherein the final UE key is calculated further based on the first UE key.

33. The apparatus of claim 31, wherein the MME-second UE key comprises an access security management entity (ASME) key (K_ASME).

34. The apparatus of claim 31, wherein the contextual information comprises at least one of: a radio network temporary identifier (RNTI) of the first UE, an expression identifier, a service identifier, or a transaction identifier.

35. The apparatus of claim 31, wherein the MME comprises a first MME associated with the first UE and a second MME associated with the second UE.

36. An apparatus for communications, comprising:
means for receiving, by a mobility management entity (MME), a shared key request from a first UE using a first non-access stratum (NAS) message, wherein the first NAS message indicates an uplink count value and includes at least a portion of contextual information associated with communication with a second UE;

means for calculating a first UE key based on a MME-first UE key that is shared between the MME and the first UE, the uplink count value, and the at least a portion of the contextual information;
wherein the means for receiving is further configured to receive a message at least indicating successful contact with the second UE; and
means for sending a second NAS message to the first UE at least indicating successful contact with the second UE.

37. The apparatus of claim 36, wherein the means for sending is further configured to send the first UE key to the second UE.

38. The apparatus of claim 36, wherein the message received from the second UE is a third NAS message including an uplink count value, and wherein the means for calculating is further configured to calculate a second UE key based on a MME-second UE key that is shared between the MME and the second UE, the uplink count value of the third NAS message from the second UE or the downlink count value of a NAS message sent to the second UE, and at least a portion of the contextual information.

39. The apparatus of claim 38, wherein the means for sending is further configured to:
page the second UE to prompt the second UE to transmit the third NAS message; and
send the first UE key and the at least a portion of the contextual information to the second UE.

40. The apparatus of claim 38, wherein the second NAS message further includes the second UE key.

41. The apparatus of claim 38, wherein the means for calculating is further configured to calculate a final UE key based on the first UE key and the second UE key; and
wherein the means for sending is further configured to send the final UE key to the first UE and the second UE using NAS messaging.

42. The apparatus of claim 38, wherein the MME-first UE key comprises an access security management entity (ASME) key (K_ASME).

43. The apparatus of claim 36, wherein the contextual information comprises at least one of: a radio network temporary identifier (RNTI), an expression identifier, service identifier, or a transaction identifier.

44. The apparatus of claim 36, wherein the MME comprises a first MME associated with the first UE and a second MME associated with the second UE.

45. An apparatus for wireless communication, comprising:
a processing system configured to:
send, by a first user equipment (UE), a shared key request using a first non-access stratum (NAS) message to a first mobility management entity (MME), wherein the first NAS message indicates an uplink count value and includes at least a portion of contextual information associated with communication with a second UE;
calculate a first UE key based on a MME-first UE key that is shared between the MME and the first UE, the uplink count value, and the at least a portion of the contextual information;
receive a second NAS message, which includes a second UE key calculated by the second UE or by a second MME associated with the second UE, from the first MME; and
calculate a final UE key based at least on the first UE key in response to reception of the second NAS message.

46. The apparatus of claim 45, wherein the final UE key is calculated further based on the second UE key.

47. The apparatus of claim 46, wherein the second UE key is generated using a MME-second UE key, a count for a NAS message associated with the second UE, and at least a portion of the contextual information.

48. The apparatus of claim 47, wherein the at least a portion of the contextual information is sent with the shared key request.

49. The apparatus of claim 45, wherein the processing system is further configured to:
perform device-to-device (D2D) communications with the second UE using the final UE key.

50. The apparatus of claim 45, wherein the MME-first UE key comprises an access security management entity (ASME) key (K_ASME).

51. The apparatus of claim 45, wherein the contextual information comprises at least one of: a first UE identifier, a radio network temporary identifier (RNTI) of the first UE or second UE, an expression identifier, a service identifier, or a transaction identifier.

52. The apparatus of claim 45, wherein the first MME is associated with the first UE.

53. An apparatus for wireless communication, comprising:
a processing system configured to:
receive from an MME a first non-access stratum (NAS) message, by a second user equipment (UE), which indicates a downlink count value and includes at least a portion of contextual information associated with communication with a first UE;
send a second NAS message;
calculate a second UE key based on a MME-second UE key that is shared between the MME and the second UE, at least one of an uplink count value associated with the second NAS message or the downlink count value, and the at least a portion of the contextual information; and
calculate a final UE key based at least on the second UE key.

54. The apparatus of claim 53, wherein a first NAS message includes the first UE key and wherein the final UE key is calculated further based on the first UE key.

55. The apparatus of claim 53, wherein the MME-second UE key comprises an access security management entity (ASME) key (K_ASME).

56. The apparatus of claim 53, wherein the contextual information comprises at least one of: a radio network temporary identifier (RNTI) of the first UE, an expression identifier, a service identifier, or a transaction identifier.

57. The apparatus of claim 53, wherein the MME comprises a first MME associated with the first UE and a second MME associated with the second UE.

58. An apparatus for wireless communication, comprising:
a processing system configured to:
receive, by a mobility management entity (MME), a shared key request from a first UE using a first non-access stratum (NAS) message, wherein the first NAS message indicates an uplink count value and includes at least a portion of contextual information associated with communication with a second UE;
calculate a first UE key based on a MME-first UE key that is shared between the MME and the first UE, the uplink count value, and the at least a portion of the contextual information;
receive a message at least indicating successful contact with the second UE; and
send a second NAS message to the first UE at least indicating successful contact with the second UE.

59. The apparatus of claim 58, wherein the processing system is further configured to send the first UE key to the second UE.

60. The apparatus of claim 58, wherein the message received from the second UE is a third NAS message including an uplink count value, and wherein the processing system is further configured to:
calculate a second UE key based on a MME-second UE key that is shared between the MME and the second UE, the uplink count value of the third NAS message from the second UE or the downlink count value of a NAS message sent to the second UE, and at least a portion of the contextual information.

61. The apparatus of claim 60, wherein the processing system is further configured to:
page the second UE to prompt the second UE to transmit the third NAS message; and
send the first UE key and the at least a portion of the contextual information to the second UE.

62. The apparatus of claim 60, wherein the second NAS message further includes the second UE key.

63. The apparatus of claim 60, wherein the processing system is further configured to:
calculate a final UE key based on the first UE key and the second UE key; and
send the final UE key to the first UE and the second UE using NAS messaging.

64. The apparatus of claim 60, wherein the MME-first UE key comprises an access security management entity (ASME) key (K_ASME).

65. The apparatus of claim 58, wherein the contextual information comprises at least one of: a radio network temporary identifier (RNTI), an expression identifier, service identifier, or a transaction identifier.

66. The apparatus of claim 58, wherein the MME comprises a first MME associated with the first UE and a second MME associated with the second UE.

67. A computer program product, comprising:
a non-transitory computer-readable medium comprising code for:
sending, by a first user equipment (UE), a shared key request using a first non-access stratum (NAS) message to a first mobility management entity (MME), wherein the first NAS message indicates an uplink count value and includes at least a portion of contextual information associated with communication with a second UE;
calculating a first UE key based on a MME-first UE key that is shared between the MME and the first UE, the uplink count value, and the at least a portion of the contextual information;
receiving a second NAS message, which includes a second UE key calculated by the second UE or by a second MME associated with the second UE, from the first MME; and
calculating a final UE key based at least on the first UE key in response to reception of the second NAS message.

68. The computer program product of claim 67, wherein the final UE key is calculated further based on the second UE key.

69. The computer program product of claim 68, wherein the second UE key is generated using a MME-second UE key, a count for a NAS message associated with the second UE, and at least a portion of the contextual information.

70. The computer program product of claim 69, wherein the at least a portion of the contextual information is sent with the shared key request.

71. The computer program product of claim 67, wherein the non-transitory computer-readable medium further comprises code for:
performing device-to-device (D2D) communications with the second UE using the final UE key.

72. The computer program product of claim 67, wherein the MME-first UE key comprises an access security management entity (ASME) key (K_ASME).

73. The computer program product of claim 67, wherein the contextual information comprises at least one of: a first UE identifier, a radio network temporary identifier (RNTI) of the first UE or second UE, an expression identifier, a service identifier, or a transaction identifier.

74. The computer program product of claim 67, wherein the first MME is associated with the first UE.

75. A computer program product, comprising:
a non-transitory computer-readable medium comprising code for:
receiving from an MME a first non-access stratum (NAS) message, by a second user equipment (UE), which indicates a downlink count value and includes at least a portion of contextual information associated with communication with a first UE;
sending a second NAS message;
calculating a second UE key based on a MME-second UE key that is shared between the MME and the second UE, at least one of an uplink count value associated with the second NAS message or the downlink count value, and the at least a portion of the contextual information; and
calculating a final UE key based at least on the second UE key.

76. The computer program product of claim 75, wherein a first NAS message includes the first UE key and wherein the final UE key is calculated further based on the first UE key.

77. The computer program product of claim 75, wherein the MME-second UE key comprises an access security management entity (ASME) key (K_ASME).

78. The computer program product of claim 75, wherein the contextual information comprises at least one of: a radio network temporary identifier (RNTI) of the first UE, an expression identifier, a service identifier, or a transaction identifier.

79. The computer program product of claim 75, wherein the MME comprises a first MME associated with the first UE and a second MME associated with the second UE.

80. A computer program product, comprising:
a non-transitory computer-readable medium comprising code for:
receiving, by a mobility management entity (MME), a shared key request from a first UE using a first non-access stratum (NAS) message, wherein the first NAS message indicates an uplink count value and includes at least a portion of contextual information associated with communication with a second UE;
calculating a first UE key based on a MME-first UE key that is shared between the MME and the first UE, the uplink count value, and the at least a portion of the contextual information;
receiving a message at least indicating successful contact with the second UE; and
sending a second NAS message to the first UE at least indicating successful contact with the second UE.

81. The computer program product of claim 80, wherein the non-transitory computer-readable medium further comprises code for sending the first UE key to the second UE.

82. The computer program product of claim 80, wherein the message received from the second UE is a third NAS message including an uplink count value, and wherein the non-transitory computer-readable medium further comprises code for:

calculating a second UE key based on a MME-second UE key that is shared between the MME and the second UE, the uplink count value of the third NAS message from the second UE or the downlink count value of a NAS message sent to the second UE, and at least a portion of the contextual information.

83. The computer program product of claim 82, wherein the non-transitory computer-readable medium further comprises code for:

paging the second UE to prompt the second UE to transmit the third NAS message; and sending the first UE key and the at least a portion of the contextual information to the second UE.

84. The computer program product of claim 82, wherein the second NAS message further includes the second UE key.

85. The computer program product of claim 82, wherein the non-transitory computer-readable medium further comprises code for:

calculating a final UE key based on the first UE key and the second UE key; and sending the final UE key to the first UE and the second UE using NAS messaging.

86. The computer program product of claim 82, wherein the MME-first UE key comprises an access security management entity (ASME) key (K_ASME).

87. The computer program product of claim 80, wherein the contextual information comprises at least one of: a radio network temporary identifier (RNTI), an expression identifier, service identifier, or a transaction identifier.

88. The computer program product of claim 80, wherein the MME comprises a first MME associated with the first UE and a second MME associated with the second UE.

* * * * *